US010503542B2

(12) United States Patent
Therien et al.

(10) Patent No.: US 10,503,542 B2
(45) Date of Patent: *Dec. 10, 2019

(54) SYSTEMS, METHODS AND DEVICES FOR WORK PLACEMENT ON PROCESSOR CORES

(71) Applicant: INTEL CORPORATION, Santa Clara, CA (US)

(72) Inventors: Guy Therien, Beaverton, OR (US); Guy Sotomayor, Big Oak Valley, CA (US); Arijit Biswas, Holden, MA (US); Michael D. Powell, Northborough, MA (US); Eric J. Dehaemer, Shrewsbury, MA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/048,570

(22) Filed: Jul. 30, 2018

(65) Prior Publication Data
US 2019/0065242 A1 Feb. 28, 2019

Related U.S. Application Data

(63) Continuation of application No. 14/973,009, filed on Dec. 17, 2015, now Pat. No. 10,037,227.

(51) Int. Cl.
G06F 9/46 (2006.01)
G06F 9/48 (2006.01)
(Continued)

(52) U.S. Cl.
CPC .......... *G06F 9/4856* (2013.01); *G06F 1/3287* (2013.01); *G06F 9/4418* (2013.01);
(Continued)

(58) Field of Classification Search
None
See application file for complete search history.

(56) References Cited

U.S. PATENT DOCUMENTS 7,461,275 B2  12/2008  Belmont et al.
7,671,627 B1 *  3/2010  Somani ................. G06F 9/3861
                                                    326/46

(Continued)

FOREIGN PATENT DOCUMENTS

WO    2013162589 A1    10/2013

OTHER PUBLICATIONS

U.S. Appl. No. 14/973,009, Notice of Allowance, dated Apr. 3, 2018, 19 pages.
(Continued)

Primary Examiner — Hiren P Patel
(74) Attorney, Agent, or Firm — Stoel Rives LLP

(57) ABSTRACT

Work can be migrated between processor cores. For example, a thread causing a heavy load on a first core can be detected. A power control unit can determine to migrate the thread from the first less-efficient core to the second more-efficient core. The power control unit can request that the first core and the second core transition to a low-power state (e.g., a sleep state, a C6 power state, etc.). The first core can transfer its software context to a first core software context storage, halt and quiesce. The second core can halt and quiesce. The software context from the first core software context storage can be transferred to a second core software context storage of the second core. A processing core identifier of the first core can be assigned to the second core. The power control unit can then request the second core to transition to an active state (such as a C0 state).

9 Claims, 6 Drawing Sheets

(51) Int. Cl.
  *G06F 1/3287* (2019.01)
  *G06F 9/50* (2006.01)
  *G06F 9/4401* (2018.01)

(52) U.S. Cl.
  CPC ............ *G06F 9/461* (2013.01); *G06F 9/4893* (2013.01); *G06F 9/5094* (2013.01); *Y02D 10/24* (2018.01); *Y02D 10/32* (2018.01); *Y02D 10/44* (2018.01)

(56) References Cited

U.S. PATENT DOCUMENTS

| | | | | |
|---|---|---|---|---|
| 7,996,663 | B2* | 8/2011 | Stillwell, Jr. | G06F 9/3824 712/228 |
| 8,689,017 | B2* | 4/2014 | Nishtala | G06F 1/3203 713/300 |
| 8,954,977 | B2* | 2/2015 | Song | G06F 1/3203 718/104 |
| 9,170,896 | B2* | 10/2015 | Ono | G06F 11/2028 |
| 9,360,927 | B2* | 6/2016 | Herdrich | G06F 9/5094 |
| 9,600,048 | B2 | 3/2017 | Kim et al. | |
| 9,720,730 | B2* | 8/2017 | Ginzburg | G06F 15/7807 |
| 9,727,388 | B2 | 8/2017 | Jahagirdar et al. | |
| 9,864,427 | B2* | 1/2018 | Herdrich | G06F 9/5094 |
| 9,870,047 | B2* | 1/2018 | Herdrich | G06F 9/5094 |
| 9,910,470 | B2* | 3/2018 | Garg | G06F 1/26 |
| 9,990,206 | B2* | 6/2018 | Wang | G06F 9/30003 |
| 10,037,227 | B2* | 7/2018 | Therien | G06F 1/3287 |
| 10,073,718 | B2* | 9/2018 | Therien | G06F 1/329 |
| 2005/0050373 | A1 | 3/2005 | Orenstien | |
| 2006/0095624 | A1 | 5/2006 | Raj et al. | |
| 2009/0023414 | A1 | 1/2009 | Zimmer et al. | |
| 2009/0165014 | A1 | 6/2009 | Park | |
| 2009/0222654 | A1* | 9/2009 | Hum | G06F 1/3203 713/100 |
| 2010/0146513 | A1* | 6/2010 | Song | G06F 1/3203 718/104 |
| 2011/0161586 | A1 | 6/2011 | Potkonjak et al. | |
| 2011/0314480 | A1 | 12/2011 | Chinya et al. | |
| 2013/0235519 | A1 | 9/2013 | Miyauchi | |
| 2013/0262902 | A1* | 10/2013 | Herdrich | G06F 9/5094 713/323 |
| 2014/0082630 | A1* | 3/2014 | Ginzburg | G06F 15/7807 718/105 |
| 2014/0101411 | A1 | 4/2014 | Sakarda | |
| 2014/0129808 | A1* | 5/2014 | Naveh | G06F 9/4856 712/225 |
| 2014/0181830 | A1* | 6/2014 | Naik | G06F 9/461 718/104 |
| 2014/0223166 | A1 | 8/2014 | Wu et al. | |
| 2014/0281380 | A1 | 9/2014 | Sodhi et al. | |
| 2014/0372802 | A1 | 12/2014 | Rao | |
| 2015/0006861 | A1 | 1/2015 | Toll et al. | |
| 2015/0193250 | A1* | 7/2015 | Ito | G06F 9/4856 718/1 |
| 2015/0378759 | A1 | 12/2015 | Pershin et al. | |
| 2016/0026507 | A1 | 1/2016 | Muckle et al. | |
| 2017/0206118 | A1 | 7/2017 | Therien et al. | |
| 2017/0371738 | A1* | 12/2017 | Cooper | G06F 9/4893 |

OTHER PUBLICATIONS

U.S. Appl. No. 14/973,009, Non-Final Office Action, dated Nov. 2, 20171, 22 pages.
PCT/US2016/059026, International Search Report and Written Opinion, dated Feb. 2, 2017, 17 pages.

\* cited by examiner

SYSTEMS, METHODS AND DEVICES FOR WORK PLACEMENT ON PROCESSOR CORES

RELATED APPLICATION

This application is a continuation of U.S. patent application Ser. No. 14/973,009, filed Dec. 17, 2015, which is hereby incorporated by reference herein in its entirety.

TECHNICAL FIELD

The present disclosure relates to processor efficiency and more specifically relates to transitioning work between processor cores.

DETAILED DESCRIPTION OF PREFERRED EMBODIMENTS

Figure 1:
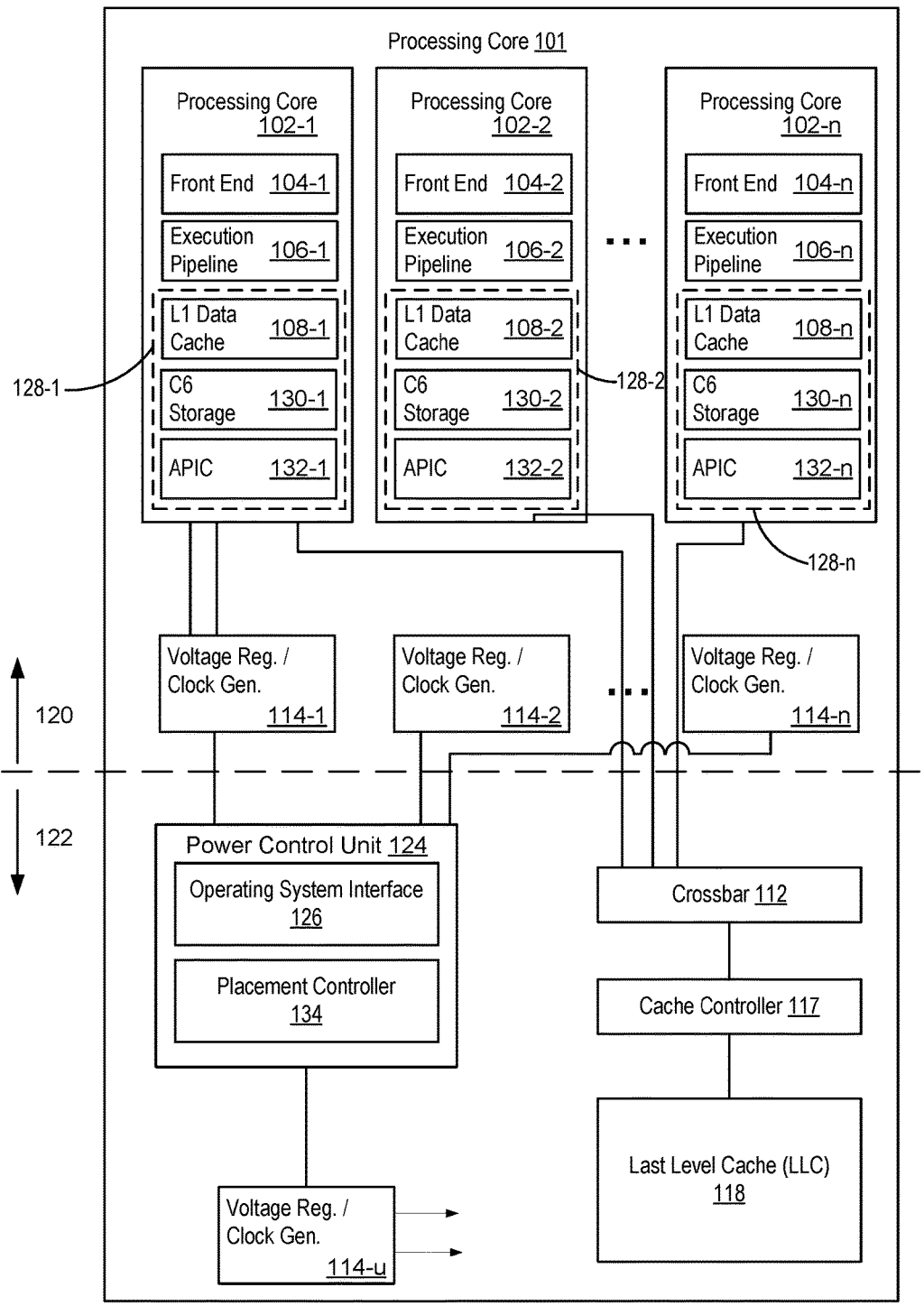
FIG. 1 is a schematic diagram illustrating a processor consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable migration of work between processor cores. For example, a thread causing a heavy load on a first core can be detected. A power control unit can determine that the heavy load is more efficiently processed by a second core. The power control unit can determine to migrate the thread from the first less-efficient core to the second more-efficient core. The power control unit can request that the first core and the second core transition to a low-power state (e.g., a sleep state, a C6 power state, etc.). The first core can transfer its software context and/or identity (also known as its state) to a first core context storage (e.g., a C6 storage), halt and quiesce. The second core can halt and quiesce. The context from the first core context storage can be transferred to a second core context storage of the second core. A processing core identity (such as a virtual identifier, advanced programmable interrupt controller identifier (APIC ID), etc.) of the first core can be reassigned to the second core. The power control unit can then request the second core to transition to an active state (such as a C0 state).

In some embodiments, the transition of context and identity from the first core to the second core is transparent to the operating system, as physical cores are given virtual identifiers. When the work is transitioned between cores, these identifiers can be transferred along with the work (such as a thread). The operating system can continue to use the virtual identifiers, while the physical cores have changed.

In other embodiments, the transition of context and identity from the first core to the second core is managed by the operating system with the help of the power control unit. For example, the power control unit can recommend to the operating system a migration of a thread from one core to another. The operating system can then cause the processor to implement the migration.

Sleep states for cores can include C0, C1 and C6 states (although other states can also exist). A C0 state is an active state in which the core runs at a normal operating mode. A C1 state (also known as a halt state) is when a clock of a core is stopped (gating the clock signal). A C6 state (also known as a deep power down state) is when a core internal voltage is reduced to any value, including 0 volts.

In some embodiments, processor cores and associated hyperthreads (or execution pipelines of a core) are exposed to an operating systems (OS) via a firmware interface (e.g., advanced configuration and power interface (ACPI)). The OS creates a list of logical processors and places work on these logical processors in accordance with the OS's scheduler policy. The OS decides the physical placement of threads within a processor package (i.e., on which core or hyperthread the thread runs). In some cases, cores are not physically homogenous. Placing work on non-optimal cores can result in higher power and/or lower performance as compared to a different choice of core. If a surplus of cores is available, the OS uses direct enumeration, and this enumeration can prevent core use for power or performance optimizations.

Migrations of context and identity can be used in several situations. Migrations can be used to move hardware threads (also known as hyperthreads) to more optimal cores that occur as a result of in-die variation. Migrations can be used for maintaining low-voltage operation of a core by not giving too large of a workload (i.e., stressing it). Hardware threads can be moved to another core when a performance need is for more than a minimal performance. Light loads spread across many cores can be combined onto fewer cores (with many hyperthreads), which can save power due to an elimination of multi-core overhead (e.g., OS-scheduler induced multi-core overhead). Migrations of hardware threads can be used for thermal management (e.g., thermal design power (TDP)), cores can be used in a serial migration fashion to spread thermal load, and/or large workloads (i.e., stress) can be physically separated by core selection. Migration of hardware threads can also enable core sequestering. Core sequestering can be used for dedicated purpose hidden execution such as eliminating a need for some virtual machine manager solutions and/or enabling individual field core testing. Migration of hardware threads can be used to enable cores with failed arithmetic units to be used when applications (e.g., software threads) do not require those failed units. Migration of hardware threads can be used for general load balancing of stress and/or thermal considerations. In some embodiments, the load balancing can depend on the OS and/or existing scheduler policy. Migration of hardware threads can be used to enable spare cores to be used alternatively with other cores to reduce overall stress, which can result in lower power and higher performance (as power demand can increase over lifetime use, and performance can decrease over lifetime use). For example, reliability-related voltage guard bands can be applied to the cores. By migrating workloads (or hardware threads), the processor can stay below the guard band while delivering lower power and higher performance.

Throughout this disclosure, a hyphenated form of a reference numeral refers to a specific instance of an element, and the unhyphenated form of the reference numeral refers to the element generically or collectively. Thus, widget 12-1 refers to an instance of a widget class, which may be referred to collectively as widgets 12, and any one of which may be referred to generically as a widget 12.

FIG. 1 illustrates a multicore processor used in conjunction with at least one embodiment. In at least one embodiment, a processor 101 includes a core region 120 and an uncore 122. In some embodiments, the core region 120 includes multiple processing cores 102, but disclosed functionality may be applicable to single core processors in a multi-processor system. In some embodiments, the processor 101 includes a first processing core 102-1, a second processing core 102-2, and so forth through an n-th processing core 102-n.

In some embodiments, the processing cores 102 include sub-elements or clusters that provide different aspects of overall functionality. In some embodiments, the processing cores 102 include a front end 104, an execution pipeline 106, and a core periphery 128. The core periphery 128 can include a first level (L1) data cache 108, a C6 storage 130 and an advanced programmable interrupt controller (APIC) 132. In at least one embodiment, the front end 104 is operable to fetch instructions from an instruction cache (not depicted) and schedule the fetched instructions for execution. In some embodiments, the execution pipeline 106 decodes and performs various mathematical, logical, memory access and flow control instructions in conjunction with a register file (not depicted) and the L1 data cache 108. Thus, in some embodiments, the front end 104 may be responsible for ensuring that a steady stream of instructions is fed to the execution pipeline 106 while the execution pipeline 106 may be responsible for executing instructions and processing the results. In some embodiments, the execution pipeline 106 may include two or more arithmetic pipelines in parallel, two or more memory access or load/store pipelines in parallel, and two or more flow control or branch pipelines. In at least one embodiment, the execution pipelines 106 may further include one or more floating point pipelines. In some embodiments, the execution pipelines 106 may include register and logical resources for executing instructions out of order, executing instructions speculatively, or both. A superscalar core can execute two or more instructions in parallel. A hyperthread core can execute two or more instruction contexts or instruction streams in parallel. Each execution pipeline of a core is called a hyperthread. A hyperthread can be exposed to an operating system as a logical core.

The core periphery 128 can include logic that supports the front end 104 and the execution pipeline 106, including managing storage and interrupts. The core periphery 128 can include the L1 data cache 108, the C6 storage 130 and the advanced programmable interrupt controller (APIC) 132. The C6 storage 130 can store a software context and identity (or core state) of the processing core 102 when the processing core 102 transitions into a low-power state (such as a C6 state). A peripheral controller (e.g., the APIC 132) can manage interrupts for the processing core 102, including identifying which interrupts apply to the associated processing core 102 and managing an APIC ID which can be used to identify an associated core.

In at least one embodiment, during execution of memory access instructions, the execution pipeline 106 attempts to execute the instructions by accessing a copy of the applicable memory address residing in the lowest-level cache memory of a cache memory subsystem that may include two or more cache memories arranged in a hierarchical configuration. In at least one embodiment, a cache memory subsystem includes the L1 data caches 108 and a last level cache (LLC) 118 in the uncore 122. In at least one embodiment, other elements of the cache memory subsystem may include a per-core instruction cache (not depicted) that operates in conjunction with the front end 104 and one or more per-core intermediate caches (not depicted). In at least one embodiment, the cache memory subsystem for the processor 101 includes L1 data and instruction caches per core, an intermediate or L2 cache memory per core that includes both instructions and data, and the LLC 118, which includes instructions and data and is shared among multiple processing cores 102. In some embodiments, if a memory access instruction misses in the L1 data cache 108, execution of the applicable program or thread may stall or slow while the cache memory subsystem accesses the various cache memories until a copy of the applicable memory address is found.

In at least one embodiment, the processor 101, the first processing core 102-1, the second processing core 102-2 and the processing core 102-n communicate via a crossbar 112, which may support data queuing, point-to-point protocols and multicore interfacing. Other embodiments of the processor 101 may employ a shared bus interconnect or direct core-to-core interconnections and protocols. In at least one embodiment, the crossbar 112 serves as an uncore controller that interconnects the processing cores 102 with the LLC 118. In some embodiments, the uncore 122 includes a cache controller 117 to implement a cache coherency policy and, in conjunction with a memory controller (not depicted), maintain coherency between a system memory (not depicted) and the various cache memories.

In at least one embodiment, a power control unit (PCU) 124 includes a placement controller 134. A power control unit is a microcontroller or programmable state machine that consumes power related telemetry (sometimes continuously) from components on the CPU in order to manage power, frequency and temperature of the components. The placement controller 134 can monitor workloads of the processing cores 102 and determine which work can be moved to a different core to increase efficiency. Efficiency can be measured in thermal output, power use and/or work accomplished. For example, efficiency can be increased by moving threads between cores that differ due to in-die variation (lower thermal output, decreased power usage, lifetime use management or more work performed). Efficiency can be increased by maintaining a low-voltage operation of a core by not providing a workload above a threshold (i.e., moving threads between cores to prevent a core from operating above a threshold, which is also known as "stressing" a core). Efficiency can be increased by combining multiple threads upon a single hyperthreading core, which saves power of a multi-core overhead. Efficiency can be increased by placing threads on cores that are physically separated to enable a larger spread of heat on the processor die. Efficiency can be increased by spreading heat by moving threads from physical processor to physical processor in sequence to heat different parts of a processor die. Efficiency can be increased by using cores with failed arithmetic units when instructions will not use the arithmetic units, and/or migrating threads between cores when the instructions will use the failed arithmetic units. Efficiency can be increased by performing load balancing for lifetime use management and/or thermal management.

In some embodiments, as a core is used and/or used to perform a large workload, the efficiency of the core decreases. The efficiency decrease can be due to a larger operating voltage and/or a larger thermal output. In some embodiments, a lifetime use of cores can be managed, and workloads transitioned between cores to spread the lifetime usage of cores. In one embodiment, the processor can report a lower core count than actually available on the processor. The workload can be spread among cores to increase the overall lifetime and efficiency of the cores beyond what would be possible without the extra unreported cores. In some embodiments, threads can be transitioned off of a core to sequester the core. The sequestered core can be tested and/or determine performance characteristics of the core. In one embodiment, core sequestering can be used in conjunction with virtual machine manager solutions. In other embodiments, a sequestered core can be used to support other dedicated-purpose, hidden execution arrangements.

In some embodiments, the hardware PCU 124 can decide thread placement among the core and hyperthread resources available. Logical processors can be enumerated to the OS. However, the number of logical processors can be less than a number of physical cores and/or hyperthreads that exist in the processor (i.e., there can be more processor resources than are enumerated to the OS). The OS places work on the logical processors visible to it, and the processor (e.g., the PCU 124) may at a later time migrate a thread to a different resource. For example, the PCU 124 can initiate a sequence that saves the core's context, restores the context to a different core, and redirects a local APIC ID of the previous core to the new core. This migration can occur at the core or thread level. Alternatively, the hardware can provide migration hints to the OS through an operating system interface 126, and the OS can move the work from one core or thread to another.

In at least one embodiment, the core region 120 includes, in addition to the processing cores 102, voltage regulator/clock generator (VRCG) circuits 114 for each core processor 102. In some embodiments, in conjunction with per-core supply voltage signals and clock frequency signals generated by the PCU 124 and provided to each processing core 102, the VRCG circuits 114 support per-core power states by applying a power state indicated by the applicable supply voltage signal and clock frequency signal to the applicable processing core 102, as well as to the uncore 122.

In some embodiments, the PCU 124 is further operable to select processing cores 102 for execution of specific threads and to migrate a thread and its corresponding performance objective or context information from a first core (e.g., the first processing core 102-1) to a second core (e.g., the second processing core 102-2), when the performance characteristics of the second processing core 102-2 make the second processing core 102-2 better suited to achieve a desired efficiency objective than the first processing core 102-1. See, e.g., FIGS. 2 and 3 for a more detailed description of migration.

In some embodiments, the processor 101 may include a hybrid assortment of cores including, in addition to the processing cores 102, graphics cores and other types of core logic. In these hybrid core embodiments, the PCU 124 determines an optimal or desirable power state, not only for the processing cores 102, but also for these other types of core elements in the core region 120. Similarly, in at least one embodiment, the processor 101 includes a VRCG circuit 114-u that provides the power state for the uncore 122 and, in this embodiment, the PCU 124 may determine the optimal or preferred power states for the uncore 122. In some embodiments, the processor 101 supports individualized power states for each processing core 102, any other types of cores in the core region 120, and the uncore 122. Other embodiments may support one power state for the entire core region 120 and one power state for the uncore 122.

The PCU 124 can also include the operating system interface 126. In some embodiments, the PCU 124 can provide recommendations for work placement or migration to an operating system through the operating system interface 126. The operating system can then perform the thread migration between cores. For example, an operating system may not have enough information to recognize that two logical processors are actually associated with one hyperthread core. The PCU 124 can recommend to the operating system that two threads be consolidated on the two logical processors, which can eliminate multi-core overhead.

Figure 2:
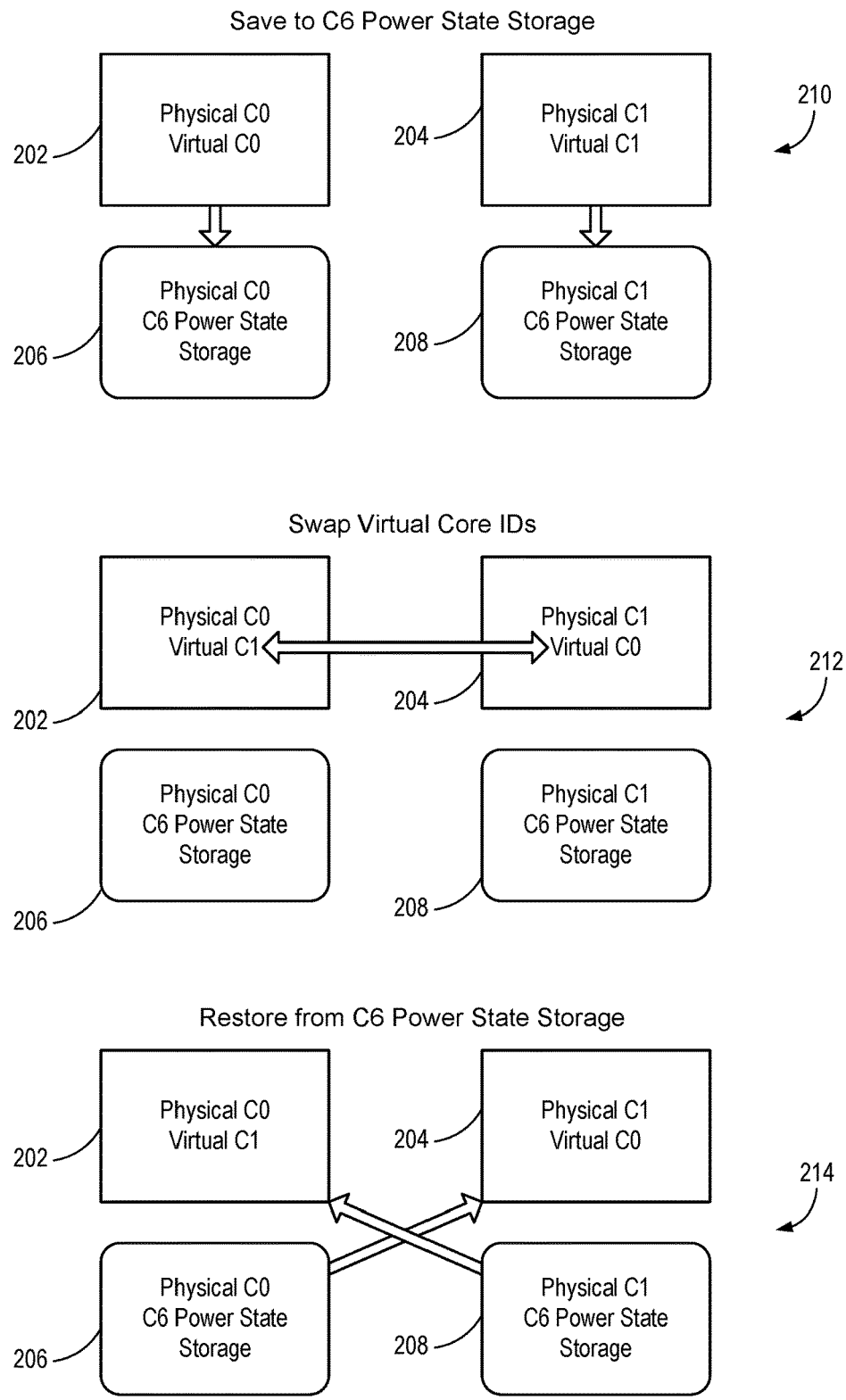
FIG. 2 is a diagram illustrating a migration flow of context and identity consistent with embodiments disclosed herein.

FIG. 2 is a diagram illustrating a migration flow consistent with embodiments disclosed herein. A multi-core system can include two cores 202, 204 and associated C6 storage 206, 208. In the embodiment shown, a physical core 0 (C0) 202 has a virtual identifier of C0 and an associated C6 storage 206. A physical core 1 (C1) 204 has a virtual identifier of C1 and an associated C6 storage 208.

When a core is placed into a power-saving state, the core software context and identity (or core state) can be saved to the C6 storage. A core software context and identity can include instruction locations, register values, APIC ID, etc. By saving the core context and identity, a core can transition into a low-power or even an off state in which the core has little or no activity, thermal activity and/or power draw. When resuming, the core can restore the core context and identity and resume processing.

A migration request is shown in FIG. 2. In some embodiments, a processor uses virtual core identifiers to hide core migration from an operating system. The migration is shown in three phases: a context saving phase 210, a virtual core swap phase 212 and a restore phase 214. In the context saving phase 210, the cores 202 and 204 receive a request to save their state to the C6 storage 206, 208 associated with the cores 202, 204. The C0 (202) saves to the C6 storage 206. The C1 (204) saves to the C6 storage 208. After saving context, both cores 202, 204 quiesce. In the virtual core swap phase 212, a virtual core ID (e.g., an APIC ID) can be swapped from the C0 (202) to the C1 (204). The C0 (202) now appears externally to be C1 and the C1 (204) now appears externally to be C0. In the restore phase 214, the context stored in the C6 storage (208) of the C1 (204) is restored to the C0 (202). The context stored in the C6 storage (206) of the C0 (202) is restored to the C1 (204). When resumed, an external system (e.g., an OS) views threads as continuing to operate on the same virtual cores. However, the physical cores 202, 204 have been swapped. It should be noted that the uncore (not shown) should redirect traffic based on virtual core IDs.

In one embodiment, a core migration flow can include the following operations: Save core states of the cores to be migrated to C6 storage. Transfer and/or swap core APIC IDs (however, the PCU maintains mapping of virtual to physical cores). Restore each core from the other core's state that was saved in C6 storage. In one embodiment, a migration latency is estimated at less than 30 microseconds.

In some embodiments, the processor hardware can include additional configurations. The uncore redirects traffic based on virtual core IDs. The PCU tracks physical and virtual mapping. A virtual to physical core ID mapping can also facilitate core sparing for defective cores. In some embodiments, migration requires a migration path through DRAM or about 40 KB of SRAM to store two cores worth of save state.

In another embodiment, an OS can be used to assist in migration. An OS core migration flow can include the following operations: The OS can use extended XSAVE and/or XRESTORE commands to migrate context. The processor hardware (e.g., the PCU) provides migration hints (e.g., messages) to the OS to move and/or swap core threads. The OS scheduler comprehends the hardware hints and performs a migration if possible. In some OS embodiments, there is not a need to move APIC IDs, as the migration is not hidden from the OS. In some embodiments, there is not a need for a separate save state, as the OS manages the threads (e.g., halts and reschedules the threads on another core). By using an OS assisted migration, the migration can be performed at a thread granularity, which enables thread consolidation and/or expansion for optimizing power, performance and/or thermal efficiency.

Figure 3:
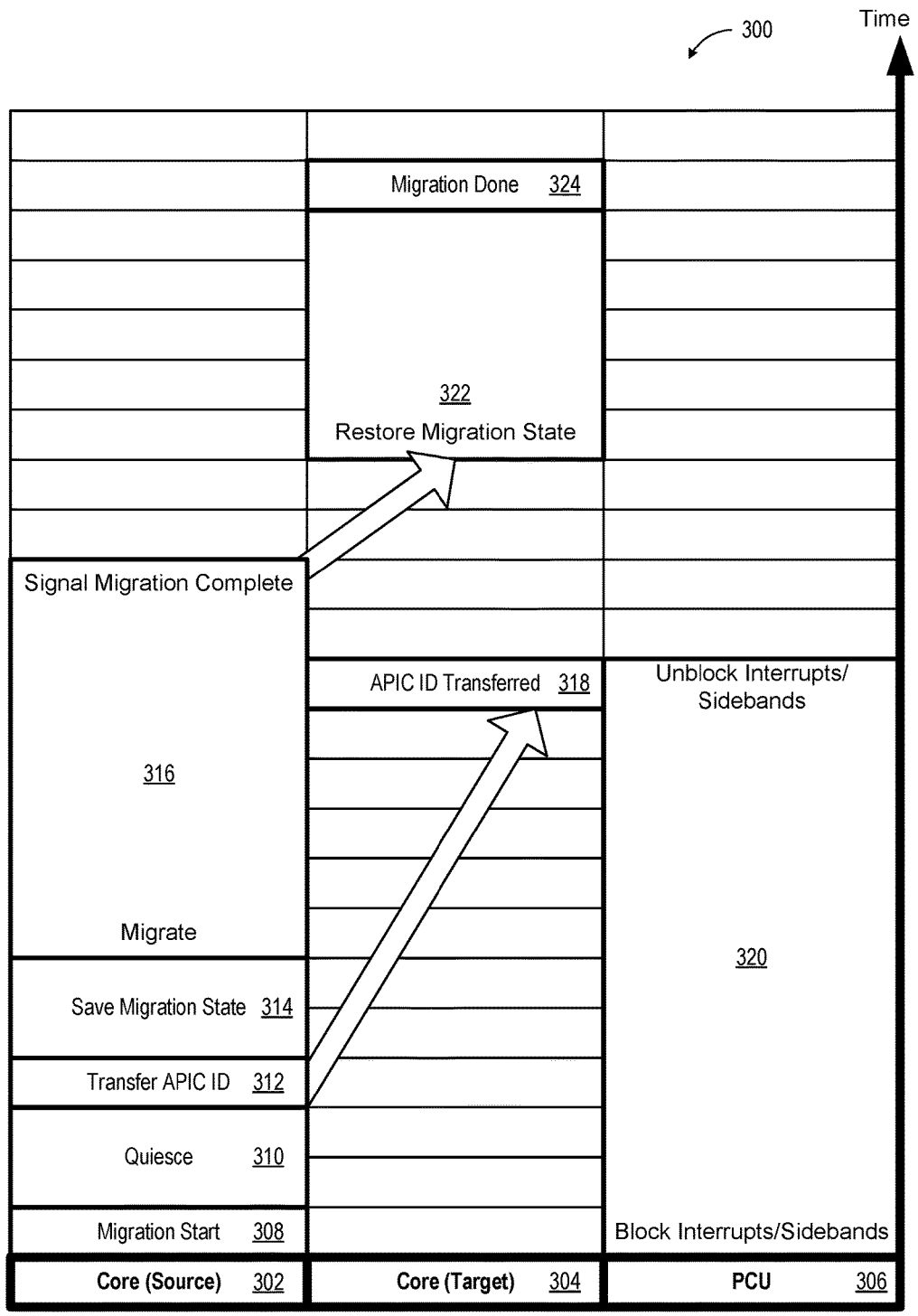
FIG. 3 is a timing diagram of a migration of context and identity consistent with embodiments disclosed herein.

FIG. 3 is a timing diagram of a migration 300 of a thread on a source core 302 to a target core 304. In block 308, the source core 302 receives a request to start the migration. The target core 304 is already in a low-power state. A PCU 306 also receives the migration request and blocks interrupts and/or sideband communications 320 to the source core 302 and/or the target core 304. In some embodiments, the blocking can include queuing the interrupts and/or sideband communications for use after a migration. In block 310, the source core 302 is set to quiesce, which can include finishing processing instructions in a pipeline and/or finishing transmission of messages, signals and/or other data. In block 312, the source core 302 begins the transfer of an APIC ID from the source core 302 to the target core 304. In block 314, the source core 302 saves its core state (e.g., instruction location, register values and/or other state data) to a core state (or context and identity) storage, such as C6 storage (which can be composed of static random access memory (SRAM), dynamic random access memory (DRAM) or other storage media). In some embodiments, each core 302, 304 has associated core state storage. In block 316, the core state is migrated from the source core 302 to the target core 304. In some embodiments, this includes copying the core state from source core 302 core state storage to intermediate storage and then the target core 304 core state storage. In other embodiments, the core state from the source core 302 is copied directly to the target core 304 core state storage. In the embodiment shown, the APIC ID transfer is completed during the migration in block 316. In the embodiment shown, the interrupts and sideband communications are unblocked after the APIC ID transfer is complete in block 318. In block 322, the target core 304 can restore the migration state transferred from the source core 302. In block 324, the migration is complete and the target core 304 can continue the thread that was transferred from the source core 302.

For example, a PCU can include Pcode instructions (Pcode instructions are instruction sequences executed by the power control unit). The PCU determines a trigger has been met to swap a first core and a second core. The PCU sends a message requesting the first core and second core to prepare for migration. The first core and second core begin to transition to a C6 sleep state. The cores drain, flush local caches and quiesce. If either core cannot service the migration request in time (e.g., is in the middle of a long microcode flow or instruction), then migration can abort after a timeout period. Both cores save their core state (such as software context and identity) to C6 storage (which can also be called a C6 array). The first core saves its core state to the first core's C6 storage. The second core saves its core state to the second core's C6 storage. Cores enter a C6 power state (i.e., the cores quiesced, halted and core state-saved). APIC IDs of the cores are swapped, and the peripheral controller state is transferred between the first core and second core. Interrupts and other uncore messages are blocked/queued up during APIC ID migration (which can be synchronized by the PCU). Peripheral controllers of the cores can be restarted with new APIC IDs. Saved states can be swapped and/or transferred between the first core state storage and the second core state storage. The cores wake up from C6 power state. Both cores restore their core state from C6 storage (which has been swapped). The first core restores the second core's saved core state. The second core restores the first core's saved core state. The cores are transitioned to an active state (e.g., a C0 state), and the cores start fetching new instructions. Execution continues as normal with contexts, peripheral controller state and APIC IDs all swapped between the first core and second core. In some embodiments, the first core can retrieve the core state directly from the second core's C6 storage and wake up from the C6 power state. Similarly, the second core can retrieve the core state directly from the first core's C6 storage and wake up from the C6 power state.

Figure 4:
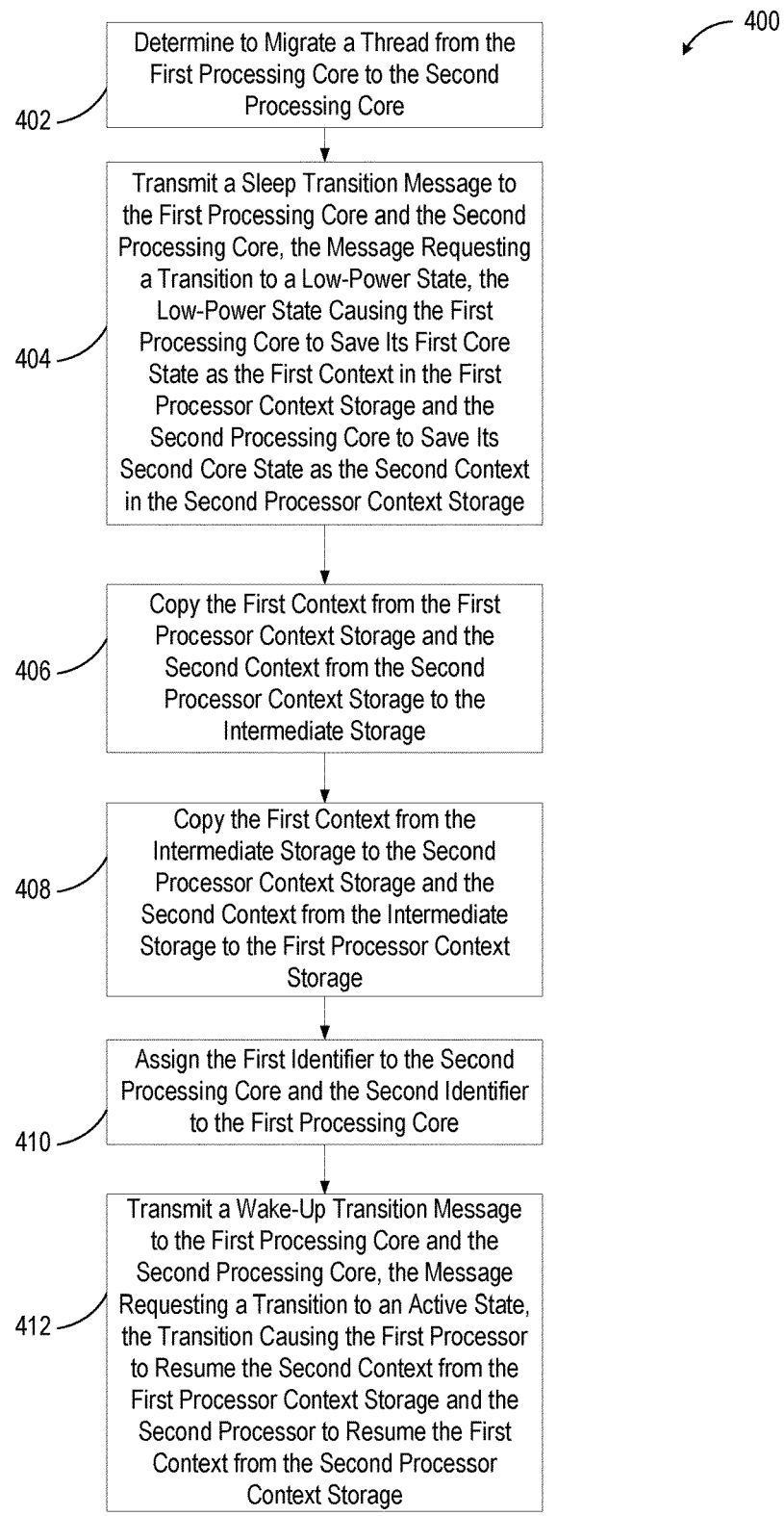
FIG. 4 is a flow chart illustrating a method for migration consistent with embodiments disclosed herein.

FIG. 4 is a flow chart illustrating a method 400 for migration consistent with embodiments disclosed herein. The method 400 can be performed by a system, such as the one shown in FIG. 1, including the processing cores 102, the C6 storage 130, the APIC 132, the PCU 124 and the placement controller 134. In box 402, the PCU determines to migrate a thread from the first processing core to the second processing core. In box 404, the PCU transmits a sleep transition message to the first processing core and the second processing core. The message requests a transition to a low-power state. The low-power state causes the first processing core to save its first core state as the first context in the first processor context storage and the second processing core to save its second core state as the second context in the second processor context storage. In box 406, the PCU copies the first context from the first processor context storage and the second context from the second processor context storage to the intermediate storage. In box 408, the PCU copies the first context from the intermediate storage to the second processor context storage and the second context from the intermediate storage to the first processor context storage. In box 410, the PCU (or other uncore system) assigns the first identifier to the second processing core and the second identifier to the first processing core. In box 412, the PCU transmits a wake-up transition message to the first processing core and the second processing core. The message requests a transition to an active state of the cores. The transition to an active state causes the first processor to resume the second context from the first processor context storage (and identity) and the second processor to resume the first context from the second processor context storage (and identity).

Figure 5:
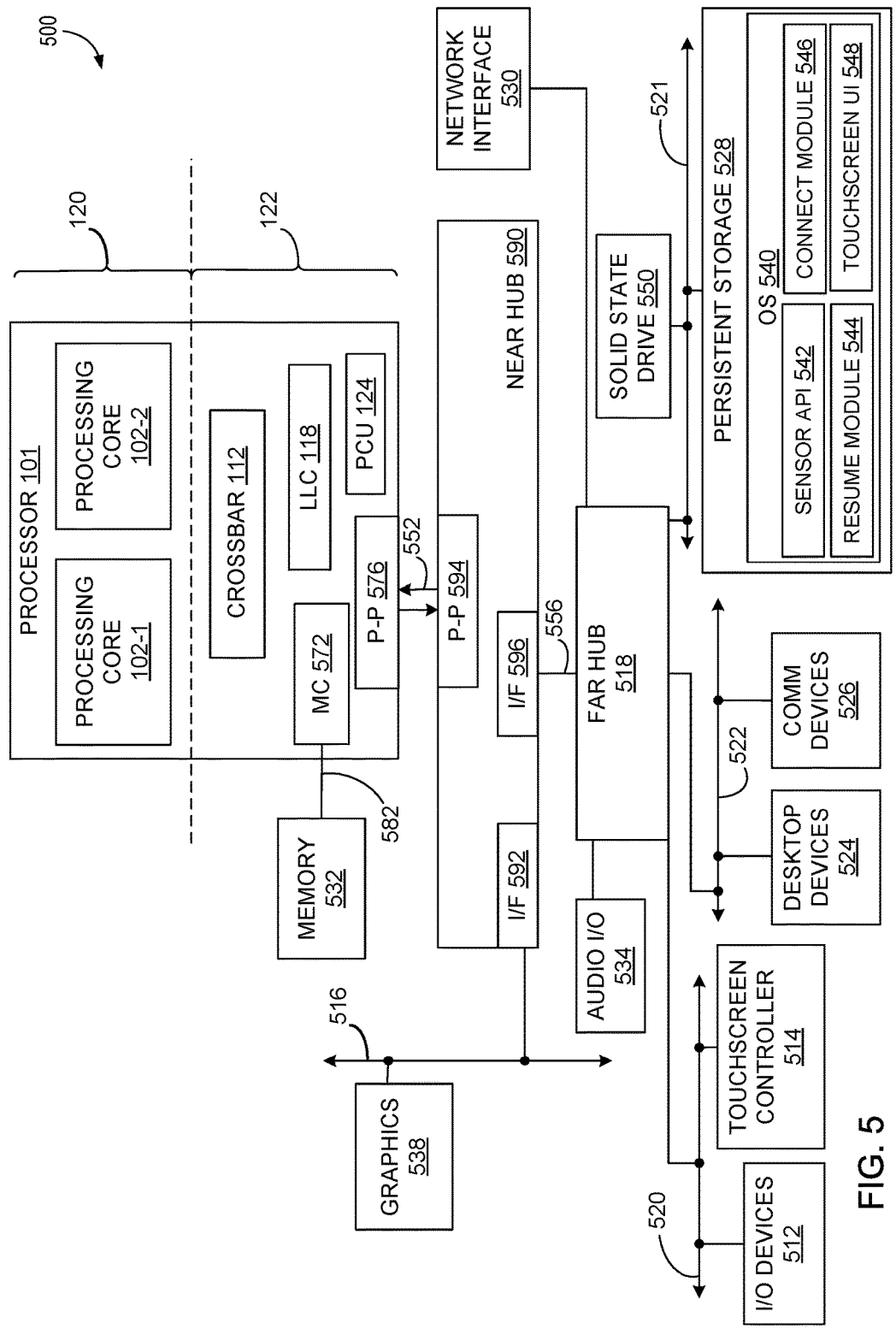
FIG. 5 is a system diagram illustrating a computer system with a processor consistent with embodiments disclosed herein.

Embodiments may be implemented in many different platforms. FIG. 5 illustrates a computer system 500 used in conjunction with at least one embodiment. In at least one embodiment, a processor, memory, and input/output devices of a processor system are interconnected by a number of point-to-point (P-P) interfaces, as will be described in further detail. However, in other embodiments, the processor system may employ different bus architectures, such as a front side bus, a multi-drop bus, and/or another implementation. Although a processor is shown in in FIG. 5 for descriptive clarity, in various embodiments, a different number of processors may be employed using elements of the illustrated architecture.

In at least one embodiment, the system 500 is a point-to-point interconnect system and includes the processor 101. While in some embodiments the system 500 may include only a single processor, in other embodiments, the system 500 may support multiple processors. In at least one embodiment, the processor 101 is a multicore processor including the first processing core 102-1 and the second processing core 102-2. It is noted that other elements of the processor 101 besides the processing cores 102 may be referred to as the uncore 122, while the processing cores 102 may also be referred to as the core region 120. In different embodiments, a varying number of cores may be present in a particular processor. In at least one embodiment, the processing cores 102 may comprise a number of sub-elements (not shown in FIG. 5), also referred to as clusters, that provide different aspects of overall functionality. The processing cores 102 may, in some embodiments, each include a memory cluster (not shown in FIG. 5) that may comprise one or more levels of cache memory. In some embodiments, other clusters (not shown in FIG. 5) in the processing cores 102 may include a front-end cluster and an execution pipeline cluster. In at least one embodiment, the processing cores 102 may include an L1 data cache. In some embodiments, the uncore 122 may include the crossbar 112, the LLC 118, a memory controller (MC) 572, the PCU 124 and a P-P interface 576. In some embodiments, the PCU 124 may be used to select a specific core based on the individual characteristics of each core on the die and the requirements of the task.

In particular embodiments, the processing cores 102 within the processor 101 are not equipped with direct means of communicating with each other, but rather, communicate via the crossbar 112, which may include intelligent functionality such as cache control, data queuing, P-P protocols, and multicore interfacing. In some embodiments, the crossbar 112 may thus represent an intelligent uncore controller that interconnects the processing cores 102 with the MC 572, the LLC 118, and the P-P interface 576, among other elements. In particular, to improve performance in such an architecture, cache controller functionality within the crossbar 112 may, in some embodiments, enable selective caching of data within a cache hierarchy including the LLC 118 and one or more caches present in the processing cores 102. In at least one embodiment, the crossbar 112 is referred to as a global queue.

In at least one embodiment, the LLC 118 may be coupled to a pair of the processing cores 102, respectively. In some embodiments, the LLC 118 may be shared by the first processing core 102-1 and the second processing core 102-2. In some embodiments, the LLC 118 may be fully shared such that any single one of the processing cores 102 may fill or access the full storage capacity of the LLC 118. Additionally, in some embodiments, the MC 572 may provide for direct access by the processor 101 to a memory 532 via a memory interface 582. In some embodiments, the memory 532 may be a double-data rate (DDR) type dynamic random-access memory (DRAM), while the memory interface 582 and the MC 572 comply with a DDR interface specification. In at least one embodiment, the memory 532 may represent a bank of memory interfaces (or slots) that may be populated with corresponding memory circuits for a desired DRAM capacity.

In some embodiments, the processor 101 may also communicate with other elements of the system 500, such as a near hub 590 and a far hub 518, which are also collectively referred to as a chipset that supports the processor 101. In at least one embodiment, the P-P interface 576 may be used by the processor 101 to communicate with the near hub 590 via an interconnect link 552. In certain embodiments, the P-P interfaces 576, 594 and the interconnect link 552 are implemented using Intel QuickPath Interconnect architecture. In at least one embodiment, the near hub 590 includes an interface 592 to couple the near hub 590 with a first bus 516, which may support high-performance I/O with corresponding bus devices, such as graphics 538 and/or other bus devices. In some embodiments, the graphics 538 may represent a high-performance graphics engine that outputs to a display device (not shown in FIG. 5). In at least one embodiment, the first bus 516 is a Peripheral Component Interconnect (PCI) bus, such as a PCI Express (PCIe) bus and/or another computer expansion bus. In some embodiments, the near hub 590 may also be coupled to the far hub 518 at an interface 596 via an interconnect link 556. In certain embodiments, the interface 596 is referred to as a south bridge. The far hub 518 may, in some embodiments, provide I/O interconnections for various computer system peripheral devices and interfaces, and may provide backward compatibility with legacy computer system peripheral devices and interfaces. Thus, in at least one embodiment, the far hub 518 provides a network interface 530 and an audio I/O 534, as well as interfaces to a second bus 520, a third bus 522, and a fourth bus 521, as will be described in further detail.

In some embodiments, the second bus 520 may support expanded functionality for the system 500 with I/O devices 512 and a touchscreen controller 514, and may be a PCI-type computer bus. In at least one embodiment, the third bus 522 may be a peripheral bus for end-user consumer devices, represented by desktop devices 524 and communication devices 526, which may include various types of keyboards, computer mice, communication devices, data storage devices, bus expansion devices, etc. In certain embodiments, the third bus 522 represents a Universal Serial Bus (USB) or similar peripheral interconnect bus. In some embodiments, the fourth bus 521 may represent a computer interface bus for connecting mass storage devices, such as hard disk drives, optical drives, and disk arrays, which are generically represented by a persistent storage 528 that may be executable by the processor 101.

In at least one embodiment, the system 500 incorporates various features that facilitate a handheld or tablet type of operation and other features that facilitate laptop or desktop operation. In addition, in some embodiments, the system 500 includes features that cooperate to aggressively conserve power while simultaneously reducing latency associated with traditional power conservation performance objectives.

In at least one embodiment, the system 500 includes an operating system 540 that may be entirely or partially stored in the persistent storage 528. In some embodiments, the operating system 540 may include various modules, application programming interfaces, and the like that expose to varying degrees various hardware and software features of the system 500. In at least one embodiment, the system 500 includes a sensor application programming interface (API) 542, a resume module 544, a connect module 546, and a touchscreen user interface 548. In some embodiments, the system 500 may further include various hardware/firmware features including the capacitive or resistive touchscreen controller 514 and a second source of persistent storage such as a solid state drive (SSD) 550.

In some embodiments, the sensor API 542 provides application program access to one or more sensors (not depicted) that may be included in the system 500. Sensors that the system 500 might have in some embodiments include an accelerometer, a global positioning system (GPS) device, a gyrometer, an inclinometer, and a light sensor. The resume module 544 may, in some embodiments, be implemented as software that, when executed, performs operations for reducing latency when transitioning the system 500 from a power conservation performance objective to an operating performance objective. In at least one embodiment, the resume module 544 may work in conjunction with the SSD 550 to reduce the amount of SSD storage required when the system 500 enters a power conservation mode. The resume module 544 may, in some embodiments, flush standby and temporary memory pages before transitioning to a sleep mode. In some embodiments, by reducing the amount of system memory space that the system 500 is required to preserve upon entering a low-power state, the resume module 544 beneficially reduces the amount of time required to perform the transition from the low-power state to an operating performance objective. In at least one embodiment, the connect module 546 may include software instructions that, when executed, perform complementary functions for conserving power while reducing the amount of latency or delay associated with traditional "wake-up" sequences. The connect module 546 may, in some embodiments, periodically update certain "dynamic" applications including email and social network applications, so that, when the system 500 wakes from a low-power mode, the applications that are often most likely to require refreshing are up-to-date. In at least one embodiment, the touchscreen user interface 548 supports the touchscreen controller 514 that enables user input via touchscreens traditionally reserved for handheld applications. In some embodiments, the inclusion of touchscreen support in conjunction with support for the communication devices 526 enables the system 500 to provide features traditionally found in dedicated tablet devices as well as features found in dedicated laptop and desktop systems.

Figure 6:
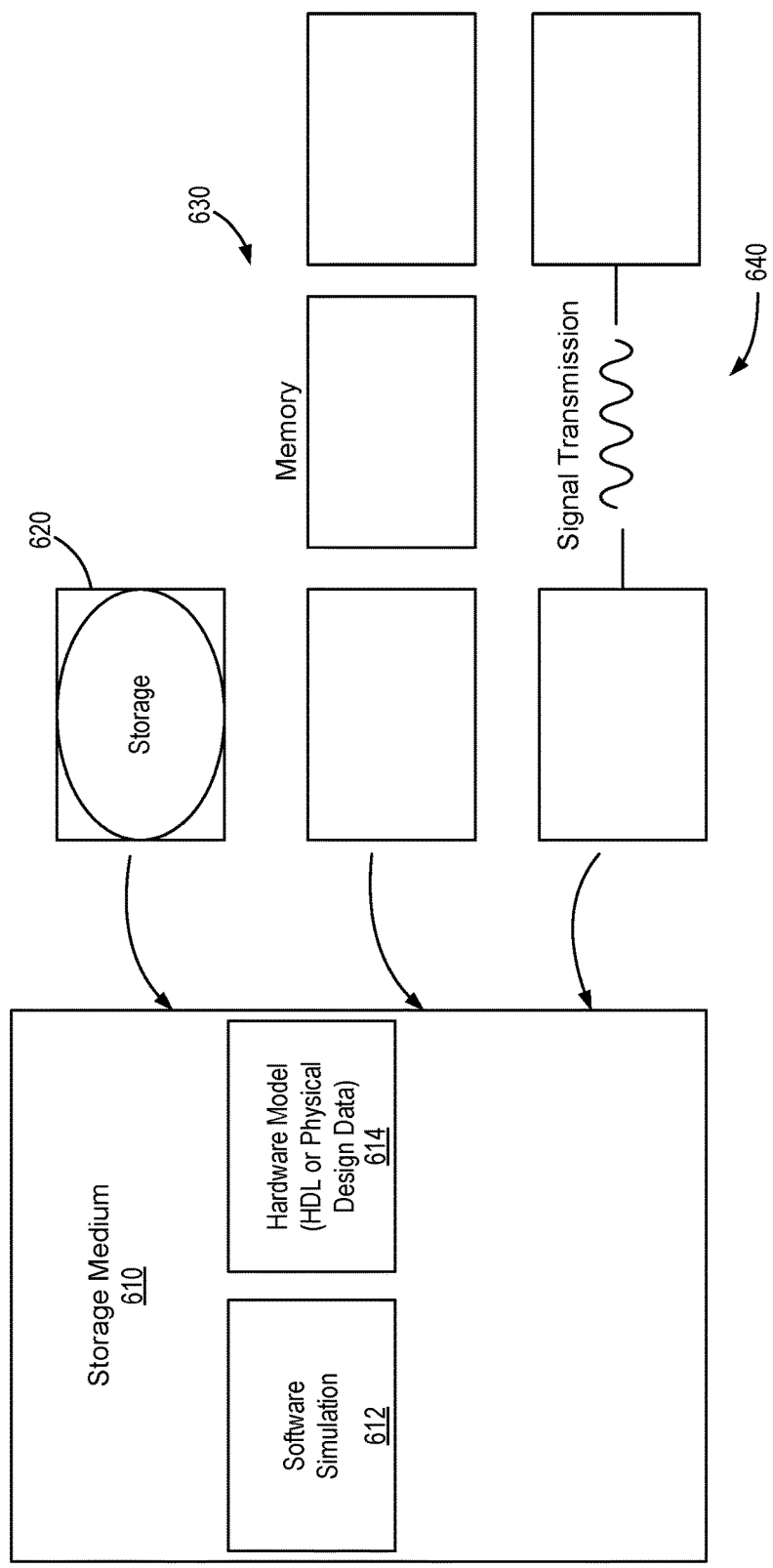
FIG. 6 is a diagram illustrating a design representation for simulation, emulation or fabrication consistent with embodiments disclosed herein.

FIG. 6 illustrates a representation for simulation, emulation, and fabrication of a design implementing the disclosed techniques. Data representing a design may represent the design in a number of manners. First, as is useful in simulations, the hardware may be represented using a hardware description language or another functional description language which basically provides a computerized model of how the designed hardware is expected to perform. In at least one embodiment, a hardware model 614 may be stored in a storage medium 610 such as a computer memory so that the hardware model 614 may be simulated using simulation software 612 that applies a particular test suite to the hardware model 614 to determine if it indeed functions as intended. In some embodiments, the simulation software 612 is not recorded, captured or contained in the storage medium 610.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, reconfigurable hardware is another embodiment that may involve a tangible machine-readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a tangible machine-readable medium. In some embodiments, an optical or electrical wave 640 modulated or otherwise generated to transmit such information, a memory 630, or a magnetic or optical storage 620 such as a disc, may be the tangible machine-readable medium. Any of these mediums may "carry" the design information. The term "carry" (e.g., a tangible machine-readable medium carrying information) thus covers information stored on a storage device or information encoded or modulated into or onto a carrier wave. The set of bits describing the design or the particular part of the design is (when embodied in a machine-readable medium such as a carrier or storage medium) an article that may be sold in and of itself or used by others for further design or fabrication.

EXAMPLES

Example 1 is a data processing system. The data processing system includes an intermediate storage to store contexts of various processing cores, and a processor. The processor consists of a first processing core, a second processing core, a first processor context storage, a second processor context storage, and a power control unit. The first and second processing cores execute instructions. The first processor context storage stores a first context of the first processing core, including a first software context and a first identity. The second processor context storage stores a second context of the second processing core, including a second context, a second software context, and a second identity. The power control unit assigns a first identifier to the first processing core and a second identifier to the second processing core, determines to migrate a thread from the first processing core to the second processing core, and transmits a sleep transition message to the first and second processing cores. The message requests transition to a low-power state, which causes the first processing core to save the first context in the first processor context storage and the second processing core to save the second context in the second processor context storage. The message also copies the first context from the first processor context storage and the second context from the second processor context storage to the intermediate storage. The message further copies the first context from the intermediate storage to the second processor context storage and the second context from the intermediate storage to the first processor context storage. The message then assigns the first identifier to the second processing core and the second identifier to the first processing core; and finally transmits a wake-up transition message to the first processing core and the second processing core. The message requesting a transition to an active state causes the first processor to resume the second context from the first processor context storage and the second processor to resume the first context from the second processor context storage.

Example 2 includes the system of Example 1, where the processor includes an operating system interface. The operating system interface is configured to provide processing core information to an operating system.

Example 3 includes the system of Example 2, where the operating system interface transmits a message to the operating system recommending transition of the thread from the first processing core to the second processing core, and receives instruction to transition the thread from the first processing core to the second processing core.

Example 4 includes the system of Example 1, where a determination to migrate a thread includes transmitting a message to an operating system, recommends to migrate the thread, and receives a command from the operating system to migrate the thread.

Example 5 includes the system of any of Examples 1-4, where the intermediate storage is external to a processor die.

Example 6 includes the system of any of Examples 1-4, where the intermediate storage is dynamic random access memory.

Example 7 includes the system of any of Examples 1-4, where the intermediate storage is static random access memory.

Example 8 includes the system of any of Examples 1-4, where the first processor context storage is static random access memory.

Example 9 includes the system of any of Examples 1-4, where the first processor context storage is a C6 processor power state storage.

Example 10 includes the system of any of Examples 1-4, where the low-power state is a C6 processor power state.

Example 11 includes the system of any of Examples 1-4, where the processor also includes a first core peripheral controller electrically coupled to the first processing core, and a second core peripheral controller electrically coupled to the second processing core. The power control unit is designed to transfer a peripheral context between the first and second core peripheral controllers.

Example 12 includes the system of Example 11, where the first core peripheral controller is an advanced programmable interrupt controller.

Example 13 includes the system of Example 11, where the power control unit is designed to stop interrupt requests to the first and second core peripheral controllers during migration, and restart interrupt requests after migration.

Example 14 is a processor for migrating work between cores. The processor includes a first processing core to execute instructions, a second processing core to execute instructions, a first processor context storage to store a first software context of the first processing core, a second processor context storage to store a second software context of the second processing core, and a power control unit. The power control unit assigns a first identifier to the first processing core, determines to migrate the work from the first processing core to the second processing core, and requests the first and second processing cores to transition to a low-power state. The first processing core saves its present state as the first software context in the first processor context storage, transfers the first software context from the first processor context storage to the second processor context storage, assigns the first identifier to the second processing core, and requests the second processing core transition to an active state. This transition causes the second processor to resume the first software context from the second processor context storage.

Example 15 includes the processor of Example 14, where the first and second processing cores share a homogenous micro-architecture but have heterogeneous physical design.

Example 16 includes the processor of Example 14, where the first and second processing cores share a homogenous instruction set but have heterogeneous physical behavior.

Example 17 includes the processor of Example 16, where the heterogeneous physical behavior is based on manufacturing variation.

Example 18 includes the processor of Example 16, where the heterogeneous physical behavior is based on design.

Example 19 includes the processor of Example 16, where the heterogeneous physical behavior is based on thermal characteristics.

Example 20 includes the processor of Example 16, where the heterogeneous physical behavior is based on power consumption.

Example 21 includes the processor of Example 16, where the heterogeneous physical behavior is based on speed of execution.

Example 22 includes the processor of any of Examples 14-21, where the power control unit is designed to report fewer processing cores to an operating system than are present within the processor.

Example 23 includes the processor of Example 22, where the power control unit is also designed to transfer the work between processing cores to decrease average use per processing core.

Example 24 includes the processor of Example 22, where the power control unit is designed to sequester a processing core from use by the operating system.

Example 25 includes the processor of Example 24, where the processor is designed to run a diagnostic sequence on a sequestered processing core.

Example 26 includes the processor of Example 25, where the power control unit is designed to hide a processing core that fails the diagnostic sequence.

Example 27 includes the processor of Example 25, where the power control unit is designed to determine partial failure of the diagnostic sequence by a processing core.

Example 28 includes the processor of Example 27, where the partial failure is an arithmetic unit of the first processing core, and where the power control unit is further designed to determine that an instruction scheduled to be processed by the first processing core will use the arithmetic unit.

Example 29 includes the processor of any of Examples 14-21, where the power control unit further determines that a migration trigger has been detected.

Example 30 includes the processor of Example 29, where the migration trigger is an increase in voltage demand of the first processing core.

Example 31 includes the processor of Example 29, where the migration trigger is a determination that a first thread on the first processing core can be combined with a second thread on the second processing core, the second processing core being a hyperthread core.

Example 32 includes the processor of Example 29, where the migration trigger is thermal determination, and where the migration is designed to spread thermal effects along the physical area of the processor.

Example 33 includes the processor of Example 29, where the migration trigger is detection of an instruction that would use a broken arithmetic unit on the first processing core.

Example 34 includes the processor of Example 29, where the migration trigger is a lifetime load measurement.

Example 35 includes the processor of Example 29, where the migration trigger is a determination of a load imbalance between the first and second processing cores.

Example 36 includes the processor of Example 35, where the load imbalance is based on thermal load.

Example 37 includes the processor of Example 35, where the load imbalance is based on a lifetime load measurement.

Example 38 is a method of transitioning a processor core workload. The method includes transmitting a migration signal to a first core and a second core, transitioning the first core to a sleep state, transitioning the second core to a sleep state, transferring a core identity from the first core to the second core, transferring the first core software context from the first core software context storage to a second core software context storage, transmitting a resume signal to the second core, and transitioning the second core from the sleep state to an active state. Transitioning the first core to a sleep state includes saving a first core software context to a first core context storage, and entering the first core into a sleep state in which the first core is quiesced and halted. Transitioning the second core to a sleep state, includes entering the second core into a sleep state in which the second core is quiesced and halted, transferring a core identity from the first core to the second core, transferring the first core software context from the first core software context storage to a second core software context storage, transmitting a resume signal to the second core, and transitioning the second core from the sleep state to an active state. This restores the first core software context to the second core from the second core software context storage.

Example 39 includes the method of Example 38, where transitioning the first core to a sleep state includes halting a first core peripheral controller responsible for the first core; transitioning the second core to a sleep state which halts a second core peripheral controller responsible for the second core; and transfers a core peripheral controller software context and the core identity from the first core peripheral controller to the second core peripheral controller.

Example 40 includes the method of Example 39, where first core peripheral controller is an advanced programmable interrupt controller (APIC).

Example 41 includes the method of Example 40, where the core identity is an APIC identifier.

Example 42 includes the method of Example 38, where the core identity is a virtual core identifier.

Example 43 includes the method of Example 38, which also stops a migration based on a timeout threshold exceeded while waiting on a response to the migration signal from the first or second core.

Example 44 includes the method of Example 38, which also transmits a request to an operating system to transition the processor core workload from the first core to the second core, and receives an instruction from the operating system to transition the processor core workload from the first core to the second core.

Example 45 includes the method of Example 38, where transferring the first processor software context from the first core software context storage to a second core software context storage also includes copying the first core software context from the first core state storage and the second core software context from the second core state storage to an intermediate storage, and includes copying the first core software context from the intermediate storage to the second core software context storage and the second core software context from the intermediate storage to the first core software context storage.

Example 46 is an apparatus including ways to perform a method as identified in any of Examples 38-45.

Example 47 is a machine-readable storage including machine-readable instructions, that when executed, implement a method or realize an apparatus as identified in any of Examples 38-45.

Example 48 is a machine-readable medium including code, that when executed, causes a machine to perform the method of any one of Examples 38-45.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions)

embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general-purpose device, such as an Intel®, AMD®, or other "off-the-shelf" microprocessor. The processor may include a special-purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. A non-transitory computer-readable storage medium that stores instructions for execution by a processing resource to perform operations of a power control unit within a processor, the operations, when executed by the processing resource, to perform a method, the method comprising to:
report fewer processing cores to an operating system than are present within the processor;
assign a first identifier to a first processing core within the processor and a second identifier to a second processing core within the processor;
detect a migration trigger that indicates detection of an instruction that would use a broken arithmetic unit on a first core;
determine to sequester the first processing core from use by the operating system and migrate a thread from the first processing core to the second processing core;
transmit a sleep transition message to the first processing core and the second processing core, the sleep transition message requesting a transition to a low-power state, the low-power state causing the first processing core to save a first context in a first processor context storage;
copy the first context from the first processor context storage to an intermediate storage;
copy the first context from the intermediate storage to a second processor context storage;
assign the first identifier to the second processing core;
sequester the first processing core from use by the operating system;
transmit a wake-up transition message to the second processing core, the wake-up transition message requesting a transition to an active state, the transition causing the second processing core to resume the first context from the second processor context storage and the second processing core to resume the first context from the second processor context storage; and
run a diagnostic sequence on the sequestered first processing core.

2. The non-transitory computer-readable storage medium of claim 1, wherein the intermediate storage is external to a processor die.

3. The non-transitory computer-readable storage medium of claim 1, wherein the low-power state is a C6 processor power state.

4. The non-transitory computer-readable storage medium of claim 1,
wherein the method further comprises to transfer a peripheral context between a first core peripheral controller and a second core peripheral controller, the first core peripheral controller electrically coupled to the first processing core and the second core peripheral controller electrically coupled to the second processing core.

5. The non-transitory computer-readable storage medium of claim 4, wherein the method further comprises to stop interrupt requests to the first core peripheral controller and the second core peripheral controller during migration and configured to restart interrupt requests after migration.

6. A non-transitory computer-readable storage medium that stores instructions for execution by a processing resource to perform operations of a processor with multiple cores, the operations, when executed by the processing resource, to perform a method, the method comprising to:
report fewer processing cores to an operating system than are present within the processor;
detect a migration trigger that indicates detection of a broken arithmetic unit on a first core;
transmit a migration signal to the first core and a second core;
transition the first core to a sleep state, including:
save a first core software context to a first core context storage; and
enter the first core into a sleep state in which the first core is quiesced and halted;
transition the second core to a sleep state, including:
enter the second core into a sleep state in which the second core is quiesced and halted;
transfer a core identity from the first core to the second core;
sequester the first core from use by the operating system;
transfer the first core software context from the first core software context storage to a second core software context storage; wherein transferring the first processor software context from the first core software context storage to a second core software context storage comprises:
copying the first core software context from the first core context storage and the second core software context from the second core context storage to an intermediate storage; and copying the first core software context from the intermediate storage to the second core software context storage and the second core software context from the intermediate storage to the first core software context storage; and transmit a resume signal to the second core;

transition the second core from the sleep state to an active state, including:

restore the first core software context to the second core from the second core software context storage; and run a diagnostic sequence on the sequestered first processing core.

7. The non-transitory computer-readable storage medium of claim 6, wherein:

transitioning the first core to a sleep state further comprises halting a first core peripheral controller responsible for the first core;

transitioning the second core to a sleep state further comprises halting a second core peripheral controller responsible for the second core; and the method further comprises transferring a core peripheral controller software context and the core identity from the first core peripheral controller to the second core peripheral controller.

8. The non-transitory computer-readable storage medium of claim 6, further comprising stopping a migration based on a timeout threshold exceeded while waiting on a response to the migration signal from the first core or the second core.

9. The non-transitory computer-readable storage medium of claim 6, further comprising transmitting a request to an operating system to transition a processor core workload from the first core to the second core; and receiving an instruction from the operating system to transition the processor core workload from the first core to the second core.

* * * * *